United States Patent
Zhang et al.

(10) Patent No.: US 9,483,332 B2
(45) Date of Patent: Nov. 1, 2016

(54) EVENT PROCESSING METHOD IN STREAM PROCESSING SYSTEM AND STREAM PROCESSING SYSTEM

(71) Applicant: Huawei Technologies Co., Ltd., Shenzhen (CN)

(72) Inventors: Songshan Zhang, Shenzhen (CN); Fengbin Fang, Hangzhou (CN); Yuzhang Li, Mexico (MX)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/849,074

(22) Filed: Sep. 9, 2015

(65) Prior Publication Data

US 2015/0378797 A1 Dec. 31, 2015

Related U.S. Application Data

(63) Continuation of application No. PCT/CN2015/072577, filed on Feb. 9, 2015.

(30) Foreign Application Priority Data

Jun. 30, 2014 (CN) .......................... 2014 1 0309554

(51) Int. Cl.
*G06F 9/54* (2006.01)
*G06F 17/30* (2006.01)

(52) U.S. Cl.
CPC ......... *G06F 9/542* (2013.01); *G06F 17/30516* (2013.01)

(58) Field of Classification Search
CPC .......................... G06F 9/542; G06F 17/30516
See application file for complete search history.

(56) References Cited

U.S. PATENT DOCUMENTS

| 2006/0224542 A1 | 10/2006 | Yalamanchi et al. |
| 2008/0109824 A1* | 5/2008 | Chen ........................ G06F 9/542 719/318 |
| 2009/0287628 A1 | 11/2009 | Indeck et al. |

(Continued)

FOREIGN PATENT DOCUMENTS

| CN | 101685466 A | 3/2010 |
| CN | 102214187 A | 10/2011 |
| CN | 104050543 A | 9/2014 |

OTHER PUBLICATIONS

Chakravarthy, S.; Jiang, Q., "Stream Data Processing: A Quality of Service Perspective," (2009), Springer, pp. 1-324.*
Partial English Translation and Abstract of Chinese Patent Application No. CN104050543, Aug. 6, 2015, 3 pages.
Foreign Communication From a Counterpart Application, PCT Application No. PCT/CN2015/0272577, International Search Report dated May 30, 2014, 8 pages.

(Continued)

*Primary Examiner* — Brian W Wathen (74) *Attorney, Agent, or Firm* — Conley Rose, P.C.; Grant Rodolph; Nicholas K. Beaulieu (57) ABSTRACT

An event processing method in a stream processing system includes matching a basic event with basic events stored in engine memories corresponding to each matching mode in a rule engine, to determine an engine memory including the basic event, and when it is determined that the engine memory including the basic event is an engine memory corresponding to a full-loop mode, inputting the basic event into the full-loop mode of the rule engine, adding a full-loop identifier to the basic event. This method implements classification processing on complex events by using different matching modes of the rule engine, improving performance of processing a complex event in an Event Stream Processing (ESP) service processing process.

12 Claims, 7 Drawing Sheets

(56) References Cited

U.S. PATENT DOCUMENTS

2009/0327199 A1* 12/2009 Weber .................... G06N 5/025
706/48
2012/0166469 A1   6/2012 Cammert et al.
2013/0346353 A1* 12/2013 Suh .................. G06Q 10/06311
706/46

OTHER PUBLICATIONS

Foreign Communication From a Counterpart Application, PCT Application No. PCT/CN2015-0272577, Written Opinion dated May 30, 2014, 6 pages.

* cited by examiner

EVENT PROCESSING METHOD IN STREAM PROCESSING SYSTEM AND STREAM PROCESSING SYSTEM

CROSS-REFERENCE TO RELATED APPLICATIONS

This application is a continuation of International Application No. PCT/CN2015/072577, filed on Feb. 9, 2015, which claims priority to Chinese Patent Application No. 201410309554.X, filed on Jun. 30, 2014, both of which are hereby incorporated by reference in their entireties.

TECHNICAL FIELD

The present disclosure relates to information processing technologies, and in particular, to an event processing method in a stream processing system and a stream processing system.

BACKGROUND

Complex event processing (CEP) is a technology in which an event is acquired from multiple event sources, a basic event is processed by using technologies such as filtering, association, and aggregation, and a complex (advanced) event is generated by means of deduction. A core of the CEP is a rule matching engine (also referred to as a CEP engine) that is used for event detection. A visual description of the CEP technology is similar to that a human body acquires basic events by using various external sensory organs, that is, different environmental phenomena; a human brain obtains a complex event by means of deduction, for example, it is going to rain, and determines an action to be taken, such as bringing the laundry.

Stream computing, that is, real-time stream computing, is to process to-be-processed data in a form of a data stream, where the data stream is a collection of a series of data records not limited in time distribution and quantity, and a data tuple is a smallest composition unit of the data stream. A most important characteristic of the real-time stream computing is a capability of responding to a computing result in real time. Value of data decreases as time elapses, and the data has to be processed as soon as possible after its presence, and preferably, data is immediately processed when the data appears. A key characteristic of the stream computing is that processing is performed once when a piece of data is generated, instead of being performed when the data is cached into a batch.

With the coming of the era of big data and large-scale application of the real-time stream computing, a traditional CEP engine gradually cannot satisfy a detection requirement of a complex event (a large data amount, a complex rule, and a high real-time requirement) in a high-speed data stream. Therefore, a complex event real-time stream processing (ESP) platform is developed based on the real-time stream computing. The ESP platform can extract, from a complex service event included in a high-speed data stream, data information that is meaningful to a user, and assist the user in performing service monitoring and decision control. Briefly, the ESP platform used to implement ESP is a stream computing platform overlaid with a CEP component.

Currently, different vendors in the industry perform update and expansion based on their original CEP engines, so as to support an ESP-related service. Different platforms use different complex event detection methods. However, affected by factors such as being limited by architecture forms of existing products of the vendors, the platforms support limited service scenarios, for example, a poor service rule customization capability and a complex customization process, which causes low performance and low usability of the complex event detection methods.

SUMMARY

Embodiments of the present disclosure provide an event processing method in a stream processing system and a stream processing system, so as to improve performance of processing a complex event in an ESP service processing process.

A first aspect provides an event processing method in a stream processing system, where the stream processing system includes an input unit and a rule engine; matching modes of the rule engine include at least a full-loop mode, a half-loop mode, and a non-loop mode; each matching mode of the rule engine is corresponding to one engine memory, and each engine memory stores at least one basic event; and the method includes acquiring, by using the input unit, at least one basic event that is used to represent a status of a target object, where the basic event includes at least one of a condition or attribute information of the target object, matching the basic event with basic events stored in engine memories that are corresponding to each matching mode in the rule engine, to determine an engine memory including the basic event, if it is determined that the engine memory including the basic event is an engine memory corresponding to the full-loop mode, inputting the basic event into the full-loop mode of the rule engine, adding a full-loop identifier to the basic event, using the basic event to which the full-loop identifier is added as a full-loop matching result, executing the basic event to obtain an execution result, modifying, according to the execution result, the attribute information of the target object in the engine memory corresponding to the full-loop mode, and matching the execution result with the basic events that are stored in engine memories in the rule engine, if it is determined that the engine memory including the basic event is an engine memory corresponding to the half-loop mode, inputting the basic event into the half-loop mode of the rule engine, adding a half-loop identifier to the basic event, using the basic event to which the half-loop identifier is added as a half-loop matching result, executing the basic event to obtain an execution result, modifying, according to the execution result, the attribute information of the target object in the engine memory corresponding to the half-loop mode, and outputting the execution result, and if it is determined that the engine memory including the basic event is an engine memory corresponding to the non-loop mode, inputting the basic event into the non-loop mode of the rule engine, adding a non-loop identifier to the basic event, using the basic event to which the non-loop identifier is added as a non-loop matching result, executing the basic event to obtain an execution result, and outputting the execution result.

In a first possible implementation manner, after the matching the basic event with basic events stored in engine memories that are corresponding to each matching mode in the rule engine, to determine an engine memory including the basic event, the method further includes if at least two matching results of the full-loop matching result, the half-loop matching result, and the non-loop matching result are obtained, performing an aggregation operation on the at least two matching results of the full-loop matching result, the half-loop matching result, and the non-loop matching result, and determining that an obtained aggregation result is a matching result outputted in a high-level matching mode, where a level of the full-loop matching result is higher than a level of the half-loop matching result, and the level of the half-loop matching result is higher than a level of the non-loop matching result.

With reference to the first aspect or the first possible implementation manner of the first aspect, in a second possible implementation manner, before the matching the basic event with basic events stored in engine memories that are corresponding to each matching mode in the rule engine, to determine an engine memory including the basic event, the method further includes acquiring at least two rule events, where the rule events include a condition, an action, and the attribute information of the target object, and the rule events are events used to represent the status of the target object and an action of the target object, determining whether an association relationship exists between an action of a first rule event and a condition of a second rule event, where the first rule event and the second rule event are any two rule events in the at least two rule events, if an association relationship exists between the action of the first rule event and the condition of the second rule event, using conditions of the first rule event and the second rule event as the basic event, and storing the basic event in the engine memory corresponding to the full-loop mode, and if an association relationship does not exist between the action of the first rule event and the condition of the second rule event, determining whether a condition of the first rule event is the attribute information of the target object.

With reference to the second possible implementation manner of the first aspect, in a third possible implementation manner, after the determining whether a condition of the first rule event is related to the attribute information of the target object, the method further includes, if it is determined that the condition of the first rule event is the attribute information of the target object, determining whether the action of the first rule event triggers the condition of the second rule event, and if it is determined that the condition of the first rule event is not the attribute information of the target object, determining to use the condition of the first rule event as the basic event and store the basic event in the engine memory corresponding to the non-loop mode.

With reference to the third possible implementation manner of the first aspect, in a fourth possible implementation manner, after the determining whether the action of the first rule event triggers attribute information of a target object of the second rule event, the method further includes, if it is determined that the action of the first rule event triggers the condition of the second rule event, determining to use the condition of the rule event as the basic event and store the basic event in the engine memory corresponding to the full-loop mode, and if it is determined that the action of the first rule event does not trigger the condition of the second rule event, determining to use the condition of the rule event as the basic event and place the basic event in the engine memory corresponding to the half-loop mode.

With reference to any possible implementation manner of the first aspect to the fourth possible implementation manner of the first aspect, in a fifth possible implementation manner, the rule engine is defined by using a domain-specific language (DSL).

A second aspect provides a stream processing system, including an input unit and a rule engine, where the rule engine includes a matching unit and an execution unit; matching modes of the rule engine include at least a full-loop mode, a half-loop mode, and a non-loop mode; each matching mode of the rule engine is corresponding to one engine memory, and each engine memory stores at least one basic event, the input unit is configured to acquire at least one basic event that is used to represent a status of a target object, where the basic event includes at least one of a condition or attribute information of the target object; the matching unit is configured to match the basic event with basic events stored in engine memories that are corresponding to each matching mode in the rule engine, to determine an engine memory including the basic event, and the execution unit is configured to, if it is determined that the engine memory including the basic event is an engine memory corresponding to the full-loop mode, input the basic event into the full-loop mode of the rule engine, add a full-loop identifier to the basic event, use the basic event to which the full-loop identifier is added as a full-loop matching result, execute the basic event to obtain an execution result, modify, according to the execution result, the attribute information of the target object in the engine memory corresponding to the full-loop mode, and match the execution result with the basic events that are stored in engine memories in the rule engine; if it is determined that the engine memory including the basic event is an engine memory corresponding to the half-loop mode, input the basic event into the half-loop mode of the rule engine, add a half-loop identifier to the basic event, use the basic event to which the half-loop identifier is added as a half-loop matching result, execute the basic event to obtain an execution result, modify, according to the execution result, the attribute information of the target object in the engine memory corresponding to the half-loop mode, and output the execution result; and if it is determined that the engine memory including the basic event is an engine memory corresponding to the non-loop mode, input the basic event into the non-loop mode of the rule engine, add a non-loop identifier to the basic event, use the basic event to which the non-loop identifier is added as a non-loop matching result, execute the basic event to obtain an execution result, and output the execution result.

In a first possible implementation manner, the execution unit is further configured to, if at least two matching results of the full-loop matching result, the half-loop matching result, and the non-loop matching result are obtained, perform an aggregation operation on the at least two matching results of the full-loop matching result, the half-loop matching result, and the non-loop matching result, and determine that an obtained aggregation result is a matching result outputted in a high-level matching mode, where a level of the full-loop matching result is higher than a level of the half-loop matching result, and the level of the half-loop matching result is higher than a level of the non-loop matching result.

With reference to the second aspect or the first possible implementation manner of the second aspect, in a second possible implementation manner, the system further includes an acquiring unit and a determining unit, where the acquiring unit is configured to acquire at least two rule events, where the rule events include a condition, an action, and the attribute information of the target object, and the rule events are events used to represent the status and an action of the target object, and the determining unit is configured to determine whether an association relationship exists between an action of a first rule event and a condition of a second rule event, where the first rule event and the second rule event are any two rule events in the at least two rule events; if an association relationship exists between the action of the first rule event and the condition of the second rule event, use conditions of the first rule event and the second rule event as the basic event, and store the basic event in the engine memory corresponding to the full-loop mode; and if an association relationship does not exist between the action of the first rule event and the condition of the second rule event, determine whether a condition of the first rule event is the attribute information of the target object.

With reference to the second possible implementation manner of the second aspect, in a third possible implementation manner, the determining unit is further configured to, if it is determined that the condition of the first rule event is the attribute information of the target object, determine whether the action of the first rule event triggers the condition of the second rule event; and if it is determined that the condition of the first rule event is not the attribute information of the target object, determine to use the condition of the first rule event as the basic event and store the basic event in the engine memory corresponding to the non-loop mode.

With reference to the third possible implementation manner of the second aspect, in a fourth possible implementation manner, the determining unit is further configured to, if it is determined that the action of the first rule event triggers the condition of the second rule event, determine to use the condition of the rule event as the basic event and store the basic event in the engine memory corresponding to the full-loop mode; and if it is determined that the action of the first rule event does not trigger the condition of the second rule event, determine to use the condition of the rule event as the basic event and place the basic event in the engine memory corresponding to the half-loop mode.

With reference to any possible implementation manner of the second aspect to the fourth possible implementation manner of the second aspect, in a fifth possible implementation manner, the rule engine is defined by using a DSL.

According to the event processing method in a stream processing system and the stream processing system that are provided in the embodiments of the present disclosure, a basic event is matched with basic events stored in engine memories that are corresponding to each matching mode in a rule engine, to determine an engine memory including the basic event; if it is determined that the engine memory including the basic event is an engine memory corresponding to a full-loop mode, the basic event is inputted into the full-loop mode of the rule engine, a full-loop identifier is added to the basic event, the basic event to which the full-loop identifier is added is used as a full-loop matching result, the basic event is executed to obtain an execution result, attribute information of a target object in the engine memory corresponding to the full-loop mode is modified according to the execution result, and the execution result is matched with the basic events that are stored in engine memories in the rule engine; if it is determined that the engine memory including the basic event is an engine memory corresponding to a half-loop mode, the basic event is inputted into the half-loop mode of the rule engine, a half-loop identifier is added to the basic event, the basic event to which the half-loop identifier is added is used as a half-loop matching result, the basic event is executed to obtain an execution result, attribute information of a target object in the engine memory corresponding to the half-loop mode is modified according to the execution result, and the execution result is outputted; and if it is determined that the engine memory including the basic event is an engine memory corresponding to a non-loop mode, the basic event is inputted into the non-loop mode of the rule engine, a non-loop identifier is added to the basic event, the basic event to which the non-loop identifier is added is used as a non-loop matching result, the basic event is executed to obtain an execution result, and the execution result is outputted. This implements classification processing on complex events by using different matching modes of the rule engine, thereby improving performance of processing a complex event in an ESP service processing process.

BRIEF DESCRIPTION OF DRAWINGS

To describe the technical solutions in the embodiments of the present disclosure art more clearly, the following briefly introduces the accompanying drawings required for describing the embodiments. The accompanying drawings in the following description show some embodiments of the present disclosure, and persons of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are some but not all of the embodiments of the present disclosure. All other embodiments obtained by persons of ordinary skill in the art based on the embodiments of the present disclosure without creative efforts shall fall within the protection scope of the present disclosure.

Figure 1:
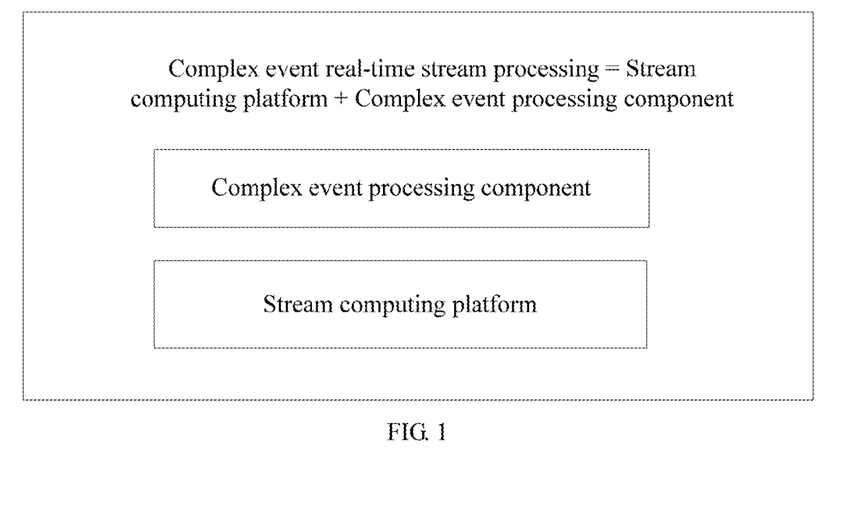
FIG. 1 is a schematic structural diagram of a platform of an event processing method in a stream processing system according to an embodiment of the present disclosure.

FIG. 1 is a schematic structural diagram of a platform of an event processing method in a stream processing system according to an embodiment of the present disclosure. As shown in FIG. 1, the event processing method in a stream processing system according to this embodiment of the present disclosure is applicable to an ESP platform, where the ESP platform is a stream computing Stream platform overlaid with a CEP component.

Figure 2:
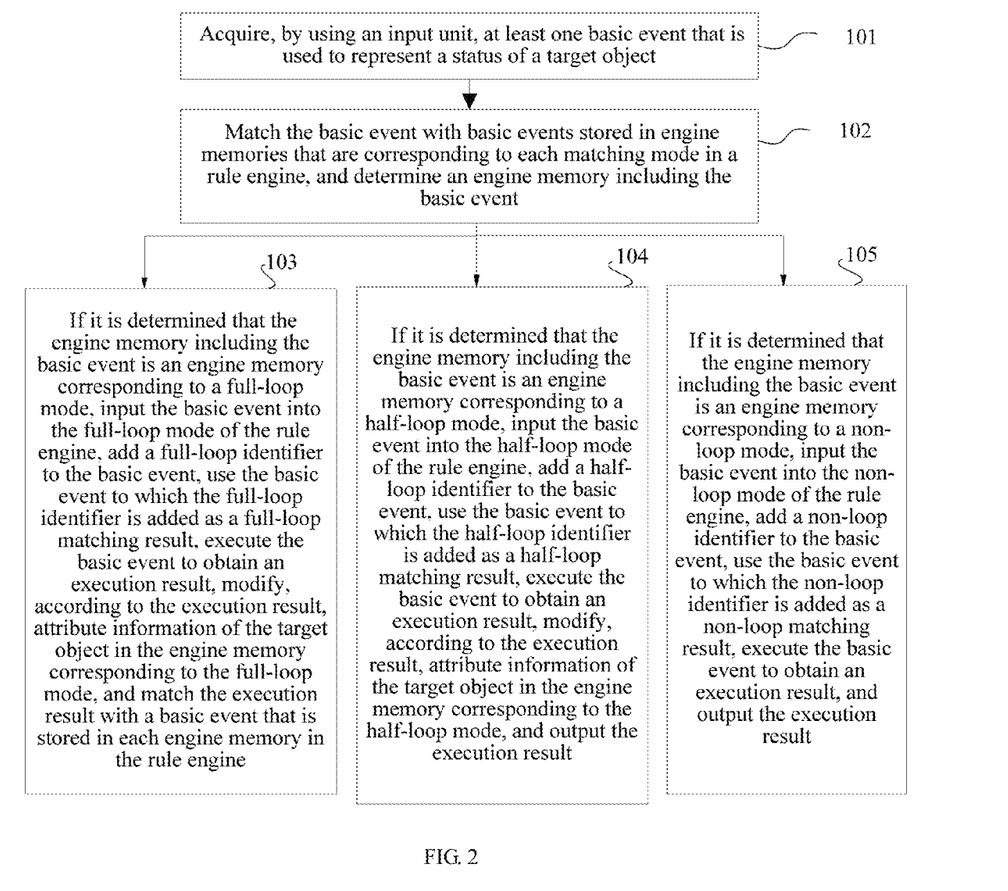
FIG. 2 is a schematic flowchart of an event processing method according to an embodiment of the present disclosure.
Figure 3:
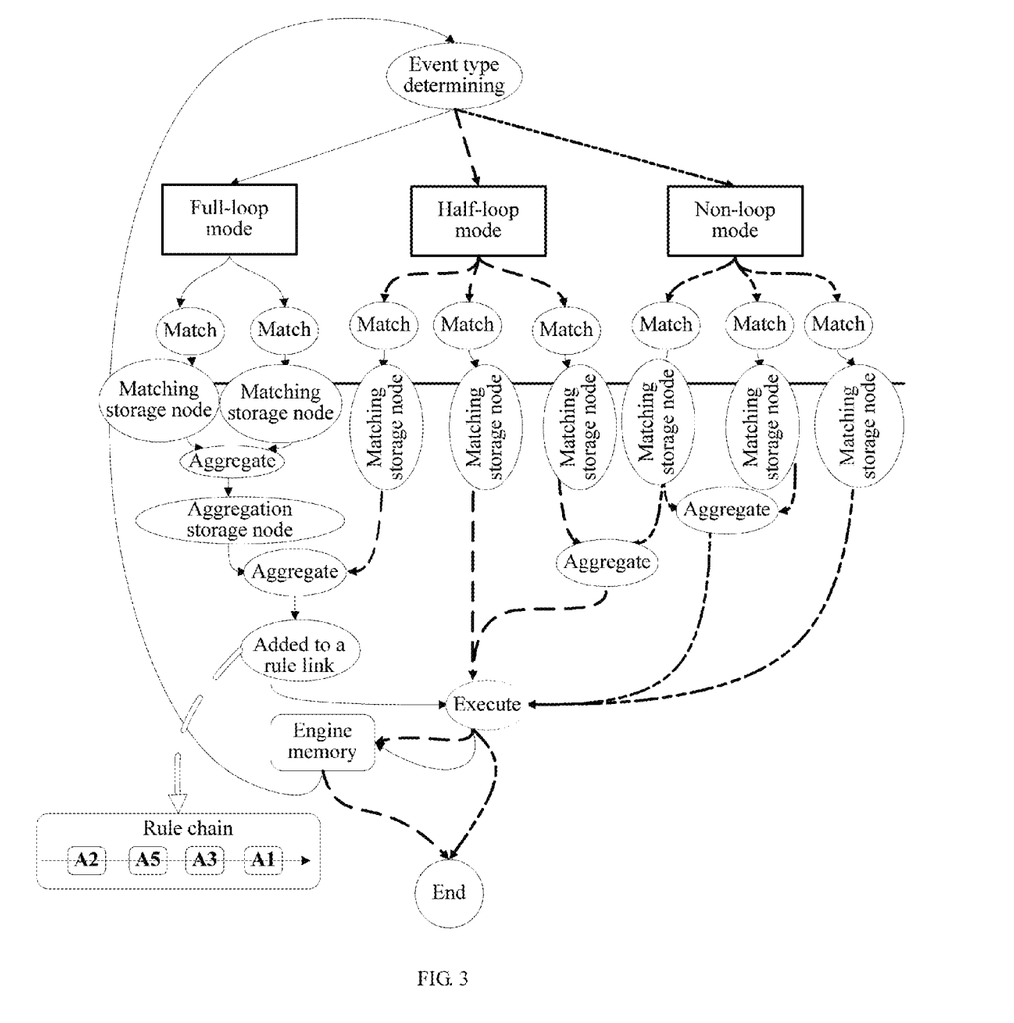
FIG. 3 is a schematic diagram of an event processing method in a stream processing system according to an embodiment of the present disclosure.

FIG. 2 is a schematic flowchart of an event processing method according to an embodiment of the present disclosure, and FIG. 3 is a schematic diagram of an event processing method in a stream processing system according to an embodiment of the present disclosure. As shown in FIG. 2 and FIG. 3, the stream processing system in this embodiment includes an input unit and a rule engine, where the rule engine is similar to a CEP component in FIG. 1; matching modes of the rule engine include at least a full-loop mode, a half-loop mode, and a non-loop mode; and each matching mode of the rule engine is corresponding to one engine memory, and each engine memory stores at least one basic event. The method in this embodiment includes Step 101: Acquire, by using the input unit, at least one basic event that is used to represent a status of a target object.

In this embodiment, the basic event includes at least one of a condition or attribute information of the target object.

For example, a basic event is acquired. For example, if call fees of a VIP user in a current month exceed 1000 yuan, it may be determined that attribute information of a target object of the basic event is a VIP user, and a condition is that call fees in a current month exceed 1000 yuan.

Step 102: Match the basic event with basic events stored in engine memories that are corresponding to each matching mode in the rule engine, to determine an engine memory including the basic event.

In this embodiment, after the engine memory including the basic event is determined, adaptation and encapsulation, for example, work such as storing the attribute information of the target object of the basic event, adapting to and converting a data structure, and adding an identifier, may be performed on the basic event, where the adding an identifier includes adding a full-loop identifier, a half-loop identifier, or a non-loop identifier to the basic event.

Step 103: If it is determined that the engine memory including the basic event is an engine memory corresponding to the full-loop mode, input the basic event into the full-loop mode of the rule engine, add a full-loop identifier to the basic event, use the basic event to which the full-loop identifier is added as a full-loop matching result, execute the basic event to obtain an execution result, modify, according to the execution result, attribute information of the target object in the engine memory corresponding to the full-loop mode, and match the execution result with the basic events that are stored in engine memories in the rule engine.

Step 104: If it is determined that the engine memory including the basic event is an engine memory corresponding to the half-loop mode, input the basic event into the half-loop mode of the rule engine, add a half-loop identifier to the basic event, use the basic event to which the half-loop identifier is added as a half-loop matching result, execute the basic event to obtain an execution result, modify, according to the execution result, attribute information of the target object in the engine memory corresponding to the half-loop mode, and output the execution result.

Step 105: If it is determined that the engine memory including the basic event is an engine memory corresponding to the non-loop mode, input the basic event into the non-loop mode of the rule engine, add a non-loop identifier to the basic event, use the basic event to which the non-loop identifier is added as a non-loop matching result, execute the basic event to obtain an execution result, and output the execution result.

In this embodiment, a basic event is matched with basic events stored in engine memories that are corresponding to each matching mode in a rule engine, to determine an engine memory including the basic event; if it is determined that the engine memory including the basic event is an engine memory corresponding to a full-loop mode, the basic event is inputted into the full-loop mode of the rule engine, a full-loop identifier is added to the basic event, the basic event to which the full-loop identifier is added is used as a full-loop matching result, the basic event is executed to obtain an execution result, attribute information of a target object in the engine memory corresponding to the full-loop mode is modified according to the execution result, and the execution result is matched with the basic events that are stored in engine memories in the rule engine; if it is determined that the engine memory including the basic event is an engine memory corresponding to a half-loop mode, the basic event is inputted into the half-loop mode of the rule engine, a half-loop identifier is added to the basic event, the basic event to which the half-loop identifier is added is used as a half-loop matching result, the basic event is executed to obtain an execution result, attribute information of a target object in the engine memory corresponding to the half-loop mode is modified according to the execution result, and the execution result is outputted; and if it is determined that the engine memory including the basic event is an engine memory corresponding to a non-loop mode, the basic event is inputted into the non-loop mode of the rule engine, a non-loop identifier is added to the basic event, the basic event to which the non-loop identifier is added is used as a non-loop matching result, the basic event is executed to obtain an execution result, and the execution result is outputted. This implements classification processing on complex events by using different matching modes of the rule engine, thereby improving performance of processing a complex event in an ESP service processing process.

Based on the foregoing embodiment, after step 102, the method may further include, if at least two matching results of the full-loop matching result, the half-loop matching result, and the non-loop matching result are obtained, performing an aggregation operation on the at least two matching results of the full-loop matching result, the half-loop matching result, and the non-loop matching result, and determining that an obtained aggregation result is a matching result outputted in a high-level matching mode, where a level of the full-loop matching result is higher than a level of the half-loop matching result, and the level of the half-loop matching result is higher than a level of the non-loop matching result.

First, the basic event enters the stream processing system through the input unit; then, the engine memory including the basic event is determined by means of matching, adaptation and encapsulation are performed on the basic event, and a matching result is obtained; then, if multiple matching results are obtained, an aggregation operation may be performed on the matching results; and if at least two matching results of the full-loop matching result, the half-loop matching result, and the non-loop matching result are obtained, an aggregation operation is performed on the at least two matching results of the full-loop matching result, the half-loop matching result, and the non-loop matching result, it is determined that an obtained aggregation result is a matching result outputted in a high-level matching mode, and the aggregation result is executed to obtain an execution result. It should be noted that the level of the full-loop matching result is higher than the level of the half-loop matching result, and the level of the half-loop matching result is higher than the level of the non-loop matching result.

Further, based on the foregoing embodiment, as shown in FIG. 3, a basic event obtained after matching is stored in a matching storage node, and the matching storage node is shared on an entire network, thereby reducing redundant matching.

Optionally, basic events obtained after matching by using the full-loop mode may be inputted, before being executed, into a rule chain for sorting, and then, basic events outputted from the rule chain are executed successively. It should be noted that a sorting rule of the rule chain for basic events may be set by persons skilled in the art according to an actual need.

Figure 4:
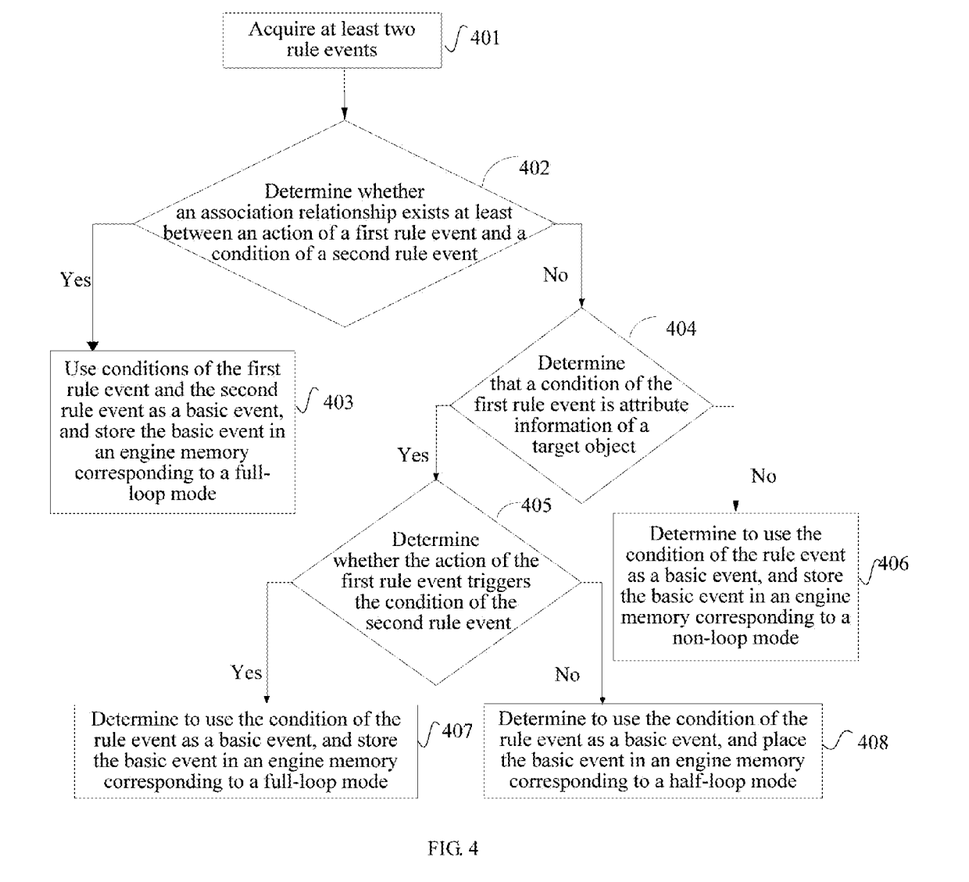
FIG. 4 is a schematic flowchart of an event processing method according to another embodiment of the present disclosure.
Figure 5:
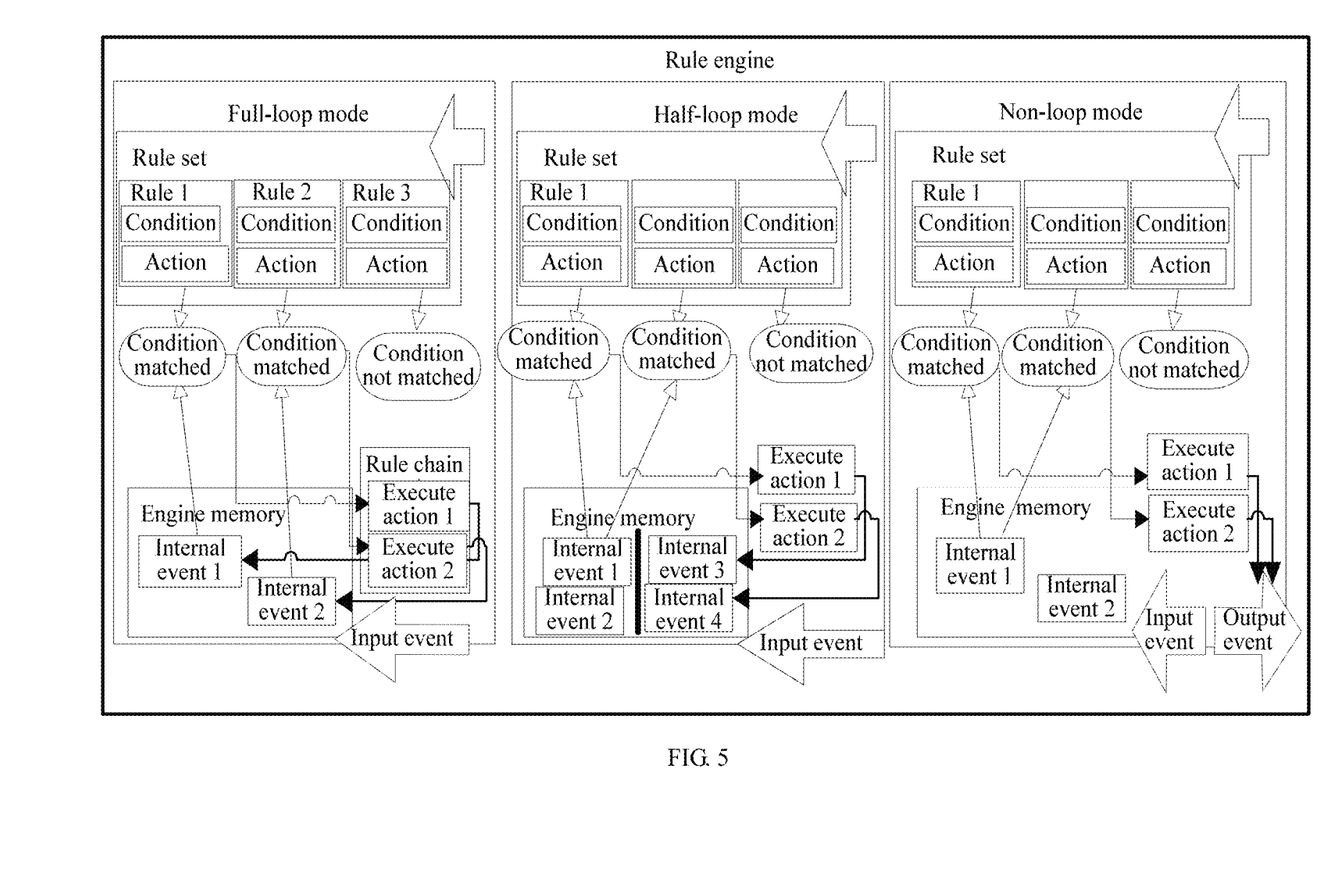
FIG. 5 is a schematic diagram of a compilation process of a rule engine according to an embodiment of the present disclosure.
Figure 6:
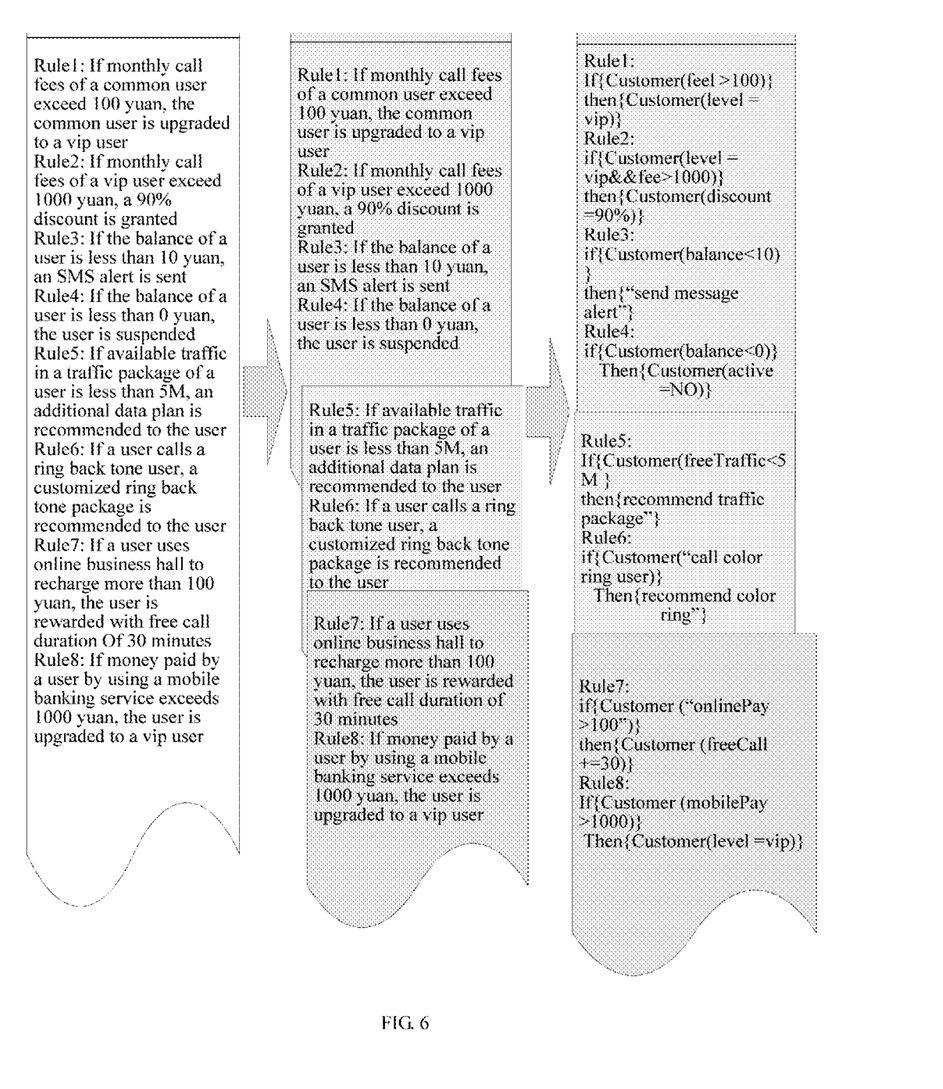
FIG. 6 is a schematic diagram of compilation of a rule engine according to an embodiment of the present disclosure.

FIG. 4 is a schematic flowchart of an event processing method according to another embodiment of the present disclosure. FIG. 5 is a schematic diagram of a compilation process of a rule engine according to an embodiment of the present disclosure. FIG. 6 is a schematic diagram of compilation of a rule engine according to an embodiment of the present disclosure. As shown in FIG. 4 and FIG. 5, based on the foregoing embodiment, before step 102, the method may further include Step 401: Acquire at least two rule events.

In this embodiment, a rule event is an event used to represent a status and an action of a target object. The rule event includes a condition, the action, and attribute information of the target object. It should be noted that the attribute information of the target object may be user information, balance information of a user, or data plan information of the user, where the user information may include a common user or a VIP user.

In this embodiment, specific content of acquiring at least two rule events may be content shown in the first column on the left in 6, but is not limited thereto. The specific content of the rule events is not listed one by one herein again.

That a rule event is rule2 is used as an example. If call fees of a VIP user in a current month exceed 1000 yuan, a 90% discount of the call fees is granted. That is, it may be determined that attribute information of a target object of the rule event is a VIP user, a condition is that call fees in a current month exceed 1000 yuan, and an action is granting a 90% discount of call fees.

Step 402: Determine whether an association relationship exists at least between an action of a first rule event and a condition of a second rule event.

In this embodiment, the first rule event and the second rule event are any two rule events in the at least two rule events. If it is determined that an association relationship exists between the action of the first rule event and the condition of the second rule event, it is determined that the first rule event and the second rule event are closely associated rules, and step 403 is performed; and if an association relationship does not exist between the action of the first rule event and the condition of the second rule event, it is determined that the first rule event and the second rule event are loosely associated rules, and step 404 is performed.

For example, the first rule event is a rule rule1, that is, a common user whose call fees of the current month exceed 100 yuan is upgraded to a VIP user; the second rule event is a rule rule2, that is, for a VIP user whose call fees of the current month exceed 1000 yuan, a 90% discount of the call fees is granted. It may be first determined that the action of the first rule event is upgrading a common user to a VIP user, and the condition of the second rule event is that call fees of a VIP user exceed 1000 yuan; in addition, it may be determined that an association relationship exists between the action of the first rule event and the condition of the second rule event, and therefore, step 403 is performed.

For another example, the first rule event is a rule rule3, that is, if the balance of a user is less than 10 yuan, a short message service (SMS) prompt is sent; the second rule event is a rule rule5, that is, if available traffic in a traffic package of a user is less than 5 megabytes (M), an additional data plan is recommended to the user. It may be first determined that the action of the first rule event is sending an SMS prompt, and the condition of the second rule event is that available traffic in a traffic package of a user is less than 5M; in addition, it may be determined that an association relationship does not exist between the action of the first rule event and the condition of the second rule event, and therefore, step 404 is performed.

In this embodiment, it is determined that rule1 and rule2 are closely associated rules, and step 403 is performed; it is determined that rule3 to rule8 are loosely associated rules, and step 404 is performed.

Step 403: Use conditions of the first rule event and the second rule event as the basic event, and store the basic event in an engine memory corresponding to a full-loop mode.

Corresponding to the example in step 402, if the first rule event is the rule rule1, and the second rule event is the rule rule2, it may be determined that the condition of the first rule event is that call fees of a common user in a current month exceed 100 yuan, and the condition of the second rule event is that call fees of a VIP user exceed 1000 yuan; the conditions are used as the basic event, and the basic event is stored in the engine memory corresponding to the full-loop mode, so that the basic event stored in the engine memory is used as a matching condition for matching the full-loop mode.

Step 404: Determine that a condition of the first rule event is attribute information of a target object.

In this embodiment, if it is determined that the condition of the first rule event is the attribute information of the target object, step 405 is performed; if it is determined that the condition of the first rule event is not the attribute information of the target object, step 406 is performed.

For example, if the first rule event is any rule event in rule3 to rule8. For example, the first rule event is rule3, that is, if the balance of a user is less than 10 yuan, an SMS prompt is sent; or the first rule event is rule4, that is, if the balance of a user is less than 0 yuan, the user is suspended; or the first rule event is rule5, that is, if available traffic in a traffic package of a user is less than 5M, an additional data plan is recommended to the user. It may be determined that conditions of the first rule events, that is, the balance of a user is less than 10 yuan, the balance of a user is less than 0 yuan, and available traffic in a traffic package of a user is less than 5M, are all the attribute information of the target object, that is, internal event object input. Therefore, step 405 may be performed.

It should be noted that before step 405 is performed, it is determined whether an action of a rule event triggers a change in attribute information of a target object of the rule event. If it is determined that the action of the rule event triggers a change in the attribute information of the target object of the rule event, it is determined that the rule event such as rule4, rule7, and rule8 is internal event object output; if it is determined that the action of the rule event does not trigger a change in the attribute information of the target object of the rule event, it is determined that the rule event such as rule3, rule5, and rule6 is external event object output.

Step 405: Determine whether the action of the first rule event triggers the condition of the second rule event.

In this embodiment, if the action of the first rule event triggers the condition of the second rule event, step 407 is performed; if the action of the first rule event does not trigger the condition of the second rule event, step 408 is performed.

It should be noted that it is determined whether the action of the first rule event triggers the condition of the second rule event, that is, if the action of the first rule event triggers the condition of the second rule event, it is determined that the first rule event and the second rule event are or are not internal event object output.

For example, the first rule event is rule8, that is, if money paid by a user by using a mobile banking service exceeds 1000 yuan, the user is upgraded to a VIP user. The second rule event is rule2, that is, if call fees of a VIP user in a current month exceed 1000 yuan, a 90% discount of the call fees is granted. The action of the first rule event, that is, upgrading a user to a VIP user, may trigger the condition of the second rule event, that is, call fees of a VIP user in a current month exceed 100 yuan. Then, step 407 is performed.

For example, the first rule event is rule3, that is, if the balance of a user is less than 10 yuan, an SMS prompt is sent; the second rule event is rule4, that is, if the balance of a user is less than 0 yuan, the user is suspended. The action of the first rule event rule3, that is, upgrading a user to a VIP user, does not trigger the condition of the second rule event rule4, that is, the balance of a user is less than 0 yuan. Then, step 406 is performed.

Step 406: Determine to use the condition of the rule event as the basic event, and store the basic event in an engine memory corresponding to a non-loop mode.

For example, conditions of rule3, rule5, and rule6 are used as the basic event, and the basic event is stored in the engine memory corresponding to the non-loop mode.

Step 407: Determine to use the condition of the rule event as the basic event, and store the basic event in an engine memory corresponding to a full-loop mode.

For example, a condition of rule8 is used as the basic event, and the basic event is stored in the engine memory corresponding to the full-loop mode.

Step 408: Determine to use the condition of the rule event as the basic event, and place the basic event in an engine memory corresponding to a half-loop mode.

For example, conditions of rule4 and rule7 are used as the basic event, and the basic event is placed in the engine memory corresponding to the half-loop mode.

It should be noted that for compilation of a rule engine, a DSL may be used to define a compilation model. As shown in FIG. 6, that is, the first column on the right, a language in a form of "if-then" is used to define the compilation model, thereby facilitating an operator to define and operate the compilation model.

In this embodiment, compilation is performed on a CEP engine according to a rule event, which improves performance of processing a complex event in an ESP service processing process.

In this embodiment, the compilation model in the foregoing embodiment may be placed in a single server, or placed in different single servers, that is, deployed in a cluster.

Figure 7:
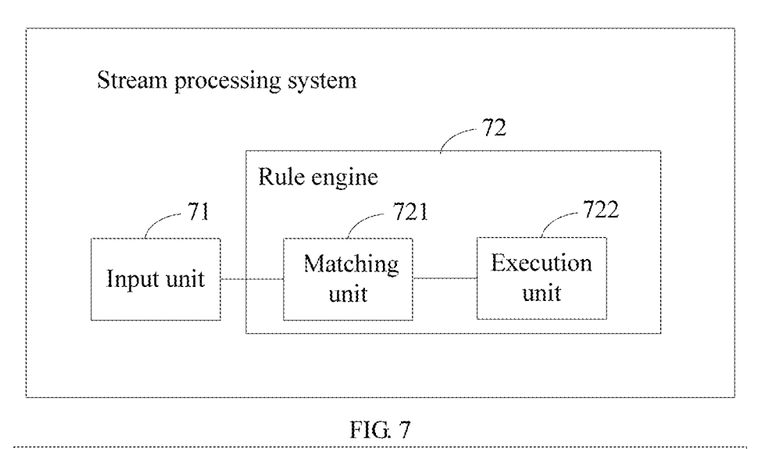
FIG. 7 is a schematic structural diagram of a stream processing system according to an embodiment of the present disclosure.

FIG. 7 is a schematic structural diagram of a stream processing system according to an embodiment of the present disclosure. As shown in FIG. 7, the stream processing system includes an input unit 71 and a rule engine 72, where the rule engine 72 includes a matching unit 721 and an execution unit 722; matching modes of the rule engine 72 include at least a full-loop mode, a half-loop mode, and a non-loop mode; each matching mode of the rule engine 72 is corresponding to one engine memory, and each engine memory stores at least one basic event.

The input unit is configured to acquire at least one basic event that is used to represent a status of a target object, where the basic event includes at least one of a condition or attribute information of the target object.

The matching unit is configured to match the basic event with basic events stored in engine memories that are corresponding to each matching mode in the rule engine 72, to determine an engine memory including the basic event.

The execution unit is configured to, if it is determined that the engine memory including the basic event is an engine memory corresponding to the full-loop mode, input the basic event into the full-loop mode of the rule engine 72, add a full-loop identifier to the basic event, use the basic event to which the full-loop identifier is added as a full-loop matching result, execute the basic event to obtain an execution result, modify, according to the execution result, the attribute information of the target object in the engine memory corresponding to the full-loop mode, and match the execution result with the basic events that are stored in engine memories in the rule engine 72; if it is determined that the engine memory including the basic event is an engine memory corresponding to the half-loop mode, input the basic event into the half-loop mode of the rule engine 72, add a half-loop identifier to the basic event, use the basic event to which the half-loop identifier is added as a half-loop matching result, execute the basic event to obtain an execution result, modify, according to the execution result, the attribute information of the target object in the engine memory corresponding to the half-loop mode, and output the execution result; and if it is determined that the engine memory including the basic event is an engine memory corresponding to the non-loop mode, input the basic event into the non-loop mode of the rule engine 72, add a non-loop identifier to the basic event, use the basic event to which the non-loop identifier is added as a non-loop matching result, execute the basic event to obtain an execution result, and output the execution result.

In this embodiment, a basic event is matched with basic events stored in engine memories that are corresponding to each matching mode in a rule engine, to determine an engine memory including the basic event; if it is determined that the engine memory including the basic event is an engine memory corresponding to a full-loop mode, the basic event is inputted into the full-loop mode of the rule engine, a full-loop identifier is added to the basic event, the basic event to which the full-loop identifier is added is used as a full-loop matching result, the basic event is executed to obtain an execution result, attribute information of a target object in the engine memory corresponding to the full-loop mode is modified according to the execution result, and the execution result is matched with the basic events that are stored in engine memories in the rule engine; if it is determined that the engine memory including the basic event is an engine memory corresponding to a half-loop mode, the basic event is inputted into the half-loop mode of the rule engine, a half-loop identifier is added to the basic event, the basic event to which the half-loop identifier is added is used as a half-loop matching result, the basic event is executed to obtain an execution result, attribute information of a target object in the engine memory corresponding to the half-loop mode is modified according to the execution result, and the execution result is outputted; and if it is determined that the engine memory including the basic event is an engine memory corresponding to a non-loop mode, the basic event is inputted into the non-loop mode of the rule engine, a non-loop identifier is added to the basic event, the basic event to which the non-loop identifier is added is used as a non-loop matching result, the basic event is executed to obtain an execution result, and the execution result is outputted. This implements classification processing on complex events by using different matching modes of the rule engine, thereby improving performance of processing a complex event in an ESP service processing process.

Further, based on the foregoing embodiment, the execution unit is further configured to, if at least two matching results of the full-loop matching result, the half-loop matching result, and the non-loop matching result are obtained, perform an aggregation operation on the at least two matching results of the full-loop matching result, the half-loop matching result, and the non-loop matching result, and determine that an obtained aggregation result is a matching result outputted in a high-level matching mode, where a level of the full-loop matching result is higher than a level of the half-loop matching result, and the level of the half-loop matching result is higher than a level of the non-loop matching result.

In this embodiment, performance of processing a complex event in an ESP service processing process is improved.

Figure 8:
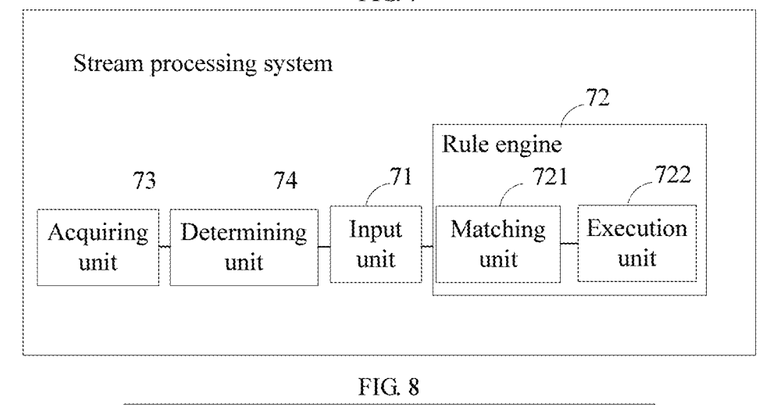
FIG. 8 is a schematic structural diagram of a stream processing system according to another embodiment of the present disclosure.

FIG. 8 is a schematic structural diagram of a stream processing system according to another embodiment of the present disclosure. Based on the foregoing embodiment shown in FIG. 7, the stream processing system may further include an acquiring unit 73 and a determining unit 74.

The acquiring unit 73 is configured to acquire at least two rule events, where the rule events include a condition, an action, and attribute information of the target object, and the rule events are events used to represent a status and an action of a target object.

The determining unit 74 is configured to determine whether an association relationship exists between an action of a first rule event and a condition of a second rule event, where the first rule event and the second rule event are any two rule events in the at least two rule events; if an association relationship exists between the action of the first rule event and the condition of the second rule event, use conditions of the first rule event and the second rule event as the basic event, and store the basic event in the engine memory corresponding to the full-loop mode; and if an association relationship does not exist between the action of the first rule event and the condition of the second rule event, determine whether a condition of the first rule event is the attribute information of the target object.

In this embodiment, performance of processing a complex event in an ESP service processing process is improved.

Based on the forgoing embodiment, the determining unit 74 is further configured to, if it is determined that the condition of the first rule event is the attribute information of the target object, determine whether the action of the first rule event triggers the condition of the second rule event; and if it is determined that the condition of the first rule event is not the attribute information of the target object, determine to use the condition of the first rule event as the basic event and store the basic event in the engine memory corresponding to the non-loop mode.

Further, based on the forgoing embodiment, the determining unit 74 is further configured to, if it is determined that the action of the first rule event triggers the condition of the second rule event, determine to use the condition of the rule event as the basic event and store the basic event in the engine memory corresponding to the full-loop mode; and if it is determined that the action of the first rule event does not trigger the condition of the second rule event, determine to use the condition of the rule event as the basic event and place the basic event in the engine memory corresponding to the half-loop mode. It should be noted that the rule engine 72 is defined by using a DSL.

In this embodiment, performance of processing a complex event in an ESP service processing process is improved.

It should be noted that in this embodiment, the technical solutions in any method embodiment mentioned above may be executed, and implementation principles and technical effects are similar to those of the method embodiment. Details are not described herein again.

Figure 9:
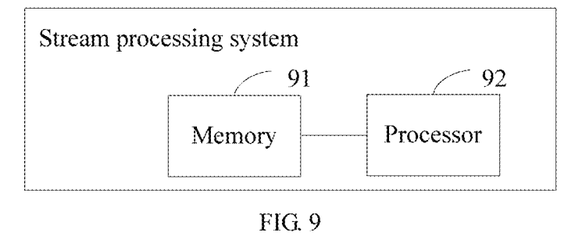
FIG. 9 is a schematic structural diagram of a stream processing system according to still another embodiment of the present disclosure.

FIG. 9 is a schematic structural diagram of a stream processing system according to still another embodiment of the present disclosure. As shown in FIG. 9, the stream processing system includes a memory 91 and a processor 92 that is connected to the memory 91. The memory 91 stores an execution instruction. When obtaining an operation instruction, the processor 92 communicates with the memory 91, and the processor 92 executes, in the stream processing system, the technical solution in any method embodiment mentioned above.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) to perform some of the steps of the methods described in the embodiments of the present disclosure. The foregoing storage medium includes: any medium that can store program code, such as a universal serial bus (USB) flash drive, a removable hard disk, a read-only memory (ROM), a random access memory (RAM), a magnetic disk, or an optical disc.

Finally, it should be noted that the foregoing embodiments are merely intended for describing the technical solutions of the present disclosure but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. An event processing method in a stream processing system, wherein the stream processing system comprises an input unit and a rule engine, wherein matching modes of the rule engine comprise at least a full-loop mode, a half-loop mode, and a non-loop mode, wherein each matching mode of the rule engine is corresponding to one engine memory, wherein each engine memory stores at least one basic event, and wherein the method comprises:
    acquiring, by using the input unit, the at least one basic event that is used to represent a status of a target object, wherein the basic event comprises at least one of a condition and attribute information of the target object;
    matching the basic event with basic events stored in engine memories that are corresponding to each matching mode in the rule engine, to determine an engine memory comprising the basic event;
    inputting the basic event into the full-loop mode of the rule engine when it is determined that the engine memory comprising the basic event is an engine memory corresponding to the full-loop mode;

adding a full-loop identifier to the basic event when it is determined that the engine memory comprising the basic event is an engine memory corresponding to the full-loop mode;
using the basic event to which the full-loop identifier is added as a full-loop matching result;
executing the basic event to obtain an execution result when it is determined that the engine memory comprising the basic event is an engine memory corresponding to the full-loop mode;
modifying, according to the execution result, the attribute information of the target object in the engine memory corresponding to the full-loop mode;
matching the execution result with the basic events that are stored in the engine memories in the rule engine;
inputting the basic event into the half-loop mode of the rule engine when it is determined that the engine memory comprising the basic event is an engine memory corresponding to the half-loop mode;
adding a half-loop identifier to the basic event when it is determined that the engine memory comprising the basic event is an engine memory corresponding to the half-loop mode;
using the basic event to which the half-loop identifier is added as a half-loop matching result;
executing the basic event to obtain an execution result when it is determined that the engine memory comprising the basic event is an engine memory corresponding to the half-loop mode;
modifying, according to the execution result, the attribute information of the target object in the engine memory corresponding to the half-loop mode;
outputting the execution result; and
inputting the basic event into the non-loop mode of the rule engine when it is determined that the engine memory comprising the basic event is an engine memory corresponding to the non-loop mode;
adding a non-loop identifier to the basic event when it is determined that the engine memory comprising the basic event is an engine memory corresponding to the non-loop mode;
using the basic event to which the non-loop identifier is added as a non-loop matching result;
executing the basic event to obtain an execution result when it is determined that the engine memory comprising the basic event is an engine memory corresponding to the non-loop mode; and
outputting the execution result.

2. The method according to claim 1, wherein after matching the basic event with basic events stored in the engine memories that are corresponding to each matching mode in the rule engine, to determine the engine memory comprising the basic event, the method further comprises:
performing an aggregation operation on at least two matching results of the full-loop matching result, the half-loop matching result, and the non-loop matching result when the at least two matching results of the full-loop matching result, the half-loop matching result, and the non-loop matching result are obtained; and
determining that an obtained aggregation result is a matching result outputted in a high-level matching mode, wherein a level of the full-loop matching result is higher than a level of the half-loop matching result, and wherein the level of the half-loop matching result is higher than a level of the non-loop matching result.

3. The method according to claim 1, wherein before matching the basic event with the basic events stored in the engine memories that are corresponding to each matching mode in the rule engine, to determine the engine memory comprising the basic event, the method further comprises:
acquiring at least two rule events, wherein the rule events comprise a condition, an action, and the attribute information of the target object, and wherein the rule events are events used to represent the status of the target object and the action of the target object;
determining whether an association relationship exists between an action of a first rule event and a condition of a second rule event, wherein the first rule event and the second rule event are any two rule events in the at least two rule events;
using conditions of the first rule event and conditions of the second rule event as the basic event when an association relationship exists between the action of the first rule event and the condition of the second rule event;
storing the basic event in the engine memory corresponding to the full-loop mode; and
determining whether a condition of the first rule event is the attribute information of the target object when the association relationship does not exist between the action of the first rule event and the condition of the second rule event.

4. The method according to claim 3, wherein after determining whether the condition of the first rule event is the attribute information of the target object, the method further comprises:
determining whether the action of the first rule event triggers the condition of the second rule event when it is determined that the condition of the first rule event is the attribute information of the target object;
determining to use the condition of the first rule event as the basic event when it is determined that the condition of the first rule event is not the attribute information of the target object; and
storing the basic event in the engine memory corresponding to the non-loop mode.

5. The method according to claim 4, wherein after determining whether the action of the first rule event triggers the condition of the second rule event, the method further comprises:
determining to use the condition of the first rule event as the basic event when it is determined that the action of the first rule event triggers the condition of the second rule event;
storing the basic event in the engine memory corresponding to the full-loop mode;
determining to use the condition of the rule event as the basic event when it is determined that the action of the first rule event does not trigger the condition of the second rule event; and
placing the basic event in the engine memory corresponding to the half-loop mode.

6. The method according to claim 1, wherein the rule engine is defined by using a domain-specific language (DSL).

7. A stream processing system, comprising:
an input unit, wherein the input unit is configured to acquire at least one basic event that is used to represent a status of a target object, wherein the basic event comprises at least one of a condition and attribute information of the target object; and
a rule engine, wherein the rule engine comprises:
a matching unit, wherein the matching unit is configured to match the basic event with basic events stored in engine memories that are corresponding to each matching mode in the rule engine, to determine an engine memory comprising the basic event; and an execution unit, wherein matching modes of the rule engine comprise at least:
a full-loop mode;
a half-loop mode; and
a non-loop mode, wherein each matching mode of the rule engine is corresponding to one engine memory, and each engine memory stores at least one basic event, and wherein the execution unit is configured to:
input the basic event into the full-loop mode of the rule engine when it is determined that the engine memory comprising the basic event is an engine memory corresponding to the full-loop mode;
add a full-loop identifier to the basic event when it is determined that the engine memory comprising the basic event is an engine memory corresponding to the full-loop mode;
use the basic event to which the full-loop identifier is added as a full-loop matching result;
execute the basic event to obtain an execution result when it is determined that the engine memory comprising the basic event is the engine memory corresponding to the full-loop mode;
modify, according to the execution result, the attribute information of the target object in the engine memory corresponding to the full-loop mode;
match the execution result with the basic events that are stored in engine memories in the rule engine;
input the basic event into the half-loop mode of the rule engine when it is determined that the engine memory comprising the basic event is an engine memory corresponding to the half-loop mode;
add a half-loop identifier to the basic event when it is determined that the engine memory comprising the basic event is the engine memory corresponding to the half-loop mode;
use the basic event to which the half-loop identifier is added as a half-loop matching result;
execute the basic event to obtain an execution result when it is determined that the engine memory comprising the basic event is the engine memory corresponding to the half-loop mode;
modify, according to the execution result, the attribute information of the target object in the engine memory corresponding to the half-loop mode;
output the execution result;
input the basic event into the non-loop mode of the rule engine when it is determined that the engine memory comprising the basic event is an engine memory corresponding to the non-loop mode;
add a non-loop identifier to the basic event when it is determined that the engine memory comprising the basic event is the engine memory corresponding to the non-loop mode;
use the basic event to which the non-loop identifier is added as a non-loop matching result;
execute the basic event to obtain an execution result when it is determined that the engine memory comprising the basic event is the engine memory corresponding to the non-loop mode; and
output the execution result.

8. The system according to claim 7, wherein the execution unit is further configured to:

perform an aggregation operation on at least two matching results of the full-loop matching result, the half-loop matching result, and the non-loop matching result when the at least two matching results of the full-loop matching result, the half-loop matching result, and the non-loop matching result are obtained; and
determine that an obtained aggregation result is a matching result outputted in a high-level matching mode, wherein a level of the full-loop matching result is higher than a level of the half-loop matching result, and the level of the half-loop matching result is higher than a level of the non-loop matching result.

9. The system according to claim 7, further comprising:
an acquiring unit, wherein the acquiring unit is configured to acquire at least two rule events, wherein the rule events comprise:
a condition;
an action; and
the attribute information of the target object, wherein the rule events are events used to represent the status of the target object and an action of the target object; and a determining unit, wherein the determining unit is configured to:
determine whether an association relationship exists between an action of a first rule event and a condition of a second rule event, wherein the first rule event and the second rule event are any two rule events in the at least two rule events;
use conditions of the first rule event and conditions of the second rule event as the basic event when the association relationship exists between the action of the first rule event and the condition of the second rule event;
store the basic event in the engine memory corresponding to the full-loop mode; and
determine whether the condition of the first rule event is the attribute information of the target object when the association relationship does not exist between the action of the first rule event and the condition of the second rule event.

10. The system according to claim 9, wherein the determining unit is further configured to:
determine whether the action of the first rule event triggers the condition of the second rule event when it is determined that the condition of the first rule event is the attribute information of the target object; and
determine to use the condition of the first rule event as the basic event when it is determined that the condition of the first rule event is not the attribute information of the target object; and
store the basic event in the engine memory corresponding to the non-loop mode.

11. The system according to claim 10, wherein the determining unit is further configured to:
determine to use the condition of the first rule event as the basic event when it is determined that the action of the first rule event triggers the condition of the second rule event;
store the basic event in the engine memory corresponding to the full-loop mode;
determine to use the condition of the rule event as the basic event when it is determined that the action of the first rule event does not trigger the condition of the second rule event; and
place the basic event in the engine memory corresponding to the half-loop mode.

12. The system according to claim 7, wherein the rule engine is defined by using a domain-specific language (DSL).

\* \* \* \* \*